US010183833B2

(12) United States Patent
Smith et al.

(10) Patent No.: US 10,183,833 B2
(45) Date of Patent: Jan. 22, 2019

(54) CABLE SPOOL ASSEMBLY

(71) Applicant: Commscope Technologies LLC, Hickory, NC (US)

(72) Inventors: Trevor D. Smith, Eden Prairie, MN (US); Thomas G. LeBlanc, Westminster, MA (US); Thomas Marcouiller, Shakopee, MN (US); Nicholas Torman, Minneapolis, MN (US); Jeffrey Thomas Kidman, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/406,399

(22) Filed: Jan. 13, 2017

(65) Prior Publication Data
US 2017/0320699 A1 Nov. 9, 2017

Related U.S. Application Data

(63) Continuation of application No. 14/720,091, filed on May 22, 2015, now Pat. No. 9,555,999, which is a
(Continued)

(51) Int. Cl.
*B65H 75/18* (2006.01)
*B65H 49/04* (2006.01)
(Continued)

(52) U.S. Cl.
CPC .......... *B65H 75/185* (2013.01); *B65H 49/04* (2013.01); *B65H 49/18* (2013.01); *B65H 75/146* (2013.01);
(Continued)

(58) Field of Classification Search
CPC .... B65H 75/185; B65H 75/146; B65H 75/22; B65H 49/04; B65H 49/18; B65H 2701/32; B65H 2701/5112; G02B 6/4457
See application file for complete search history.

(56) References Cited

U.S. PATENT DOCUMENTS 250,430 A 12/1881 Engisch et al.
335,692 A 2/1886 Fries
(Continued)

FOREIGN PATENT DOCUMENTS

GB 339416 12/1930
GB 2165214 4/1986
(Continued)

OTHER PUBLICATIONS

Defendapack, Web-Archive, Jun. 25, 2009, http://web.archive.org/web/20090501000000*/http://www.defendapack.co.uk/corrugated_cardboard_cable_reels_spools.htm.*, 4 pgs.
(Continued)

*Primary Examiner* — Peter Radkowski

(57) ABSTRACT

A spool assembly includes a drum having a first axial end and an oppositely disposed second axial end. The drum includes an inner surface that defines a bore that extends through the first and second axial ends. A drum support is disposed in the bore of the drum. The drum support includes a first end and an oppositely disposed second end. The drum support has an exterior surface. The exterior surface of the drum support and the inner surface of the drum define a plurality of channels. A first flange is engaged to the first end of the drum support. A second flange is engaged to the second end of the drum support.

5 Claims, 15 Drawing Sheets

Related U.S. Application Data continuation of application No. 13/195,939, filed on Aug. 2, 2011, now Pat. No. 9,042,700.

(60) Provisional application No. 61/488,572, filed on May 20, 2011, provisional application No. 61/370,070, filed on Aug. 2, 2010.

(51) Int. Cl.
*B65H 75/14* (2006.01)
*G02B 6/44* (2006.01)
*B65H 49/18* (2006.01)
*B65H 75/22* (2006.01)

(52) U.S. Cl.
CPC .......... *B65H 75/22* (2013.01); *G02B 6/4457* (2013.01); *B65H 2701/32* (2013.01); *B65H 2701/5112* (2013.01)

(56) References Cited

U.S. PATENT DOCUMENTS

| | | | | |
|---|---|---|---|---|
| 1,677,491 | A | 7/1928 | Rice | |
| 1,762,386 | A | 6/1930 | Collingbourne | |
| 1,999,765 | A | 4/1935 | Laveua | |
| 2,167,957 | A | 8/1939 | Nykamp | |
| 2,171,648 | A * | 9/1939 | Ennis | A47K 10/3836 242/597.3 |
| 2,452,378 | A * | 10/1948 | Hudson | B65H 75/141 242/601 |
| 2,529,420 | A * | 11/1950 | Ramquist | A47K 10/3836 235/1 C |
| 2,546,820 | A * | 3/1951 | Grant | A47K 10/22 242/599.1 |
| 2,799,458 | A | 7/1957 | Nye | |
| 2,828,090 | A * | 3/1958 | Steinback | B65H 75/14 242/118.7 |
| 2,872,125 | A * | 2/1959 | Rial | A47K 10/3836 242/560.2 |
| 2,928,618 | A * | 3/1960 | Locke | A47K 10/3836 242/423.1 |
| 3,222,011 | A | 12/1965 | Webb | |
| 3,284,022 | A | 11/1966 | Eifrid | |
| 3,325,203 | A | 6/1967 | Moler | |
| 3,593,936 | A * | 7/1971 | Davis | A47K 10/3836 242/578 |
| 3,661,341 | A | 5/1972 | Eifrid | |
| 3,836,090 | A | 9/1974 | Mix | |
| 3,870,245 | A * | 3/1975 | Witteborg, Jr. | A01K 89/0111 242/118.4 |
| 3,876,073 | A | 4/1975 | Herbetko | |
| 3,958,775 | A | 5/1976 | Liga | |
| 4,076,185 | A | 2/1978 | Dorph | |
| 4,244,538 | A | 1/1981 | Theros | |
| 4,451,013 | A | 5/1984 | Bedrosian | |
| 4,553,711 | A * | 11/1985 | Urion | A47K 10/3836 242/129.5 |
| 4,607,809 | A * | 8/1986 | Sineni | A47K 10/22 242/560 |
| 4,667,896 | A * | 5/1987 | Frey | B65H 75/146 242/118.41 |
| 4,696,438 | A | 9/1987 | Myers | |
| 4,741,486 | A * | 5/1988 | Ancona | A47K 10/3836 242/597.4 |
| 4,756,488 | A * | 7/1988 | Cooke | B65H 75/14 242/608.5 |
| 5,058,792 | A * | 10/1991 | Morand | A47K 10/3836 225/42 |
| 5,100,075 | A * | 3/1992 | Morand | A47K 10/3836 206/389 |
| 5,120,003 | A * | 6/1992 | Sacconi | A01K 89/016 242/317 |
| 5,195,699 | A * | 3/1993 | Stinnette | A01K 89/0111 242/118.6 |
| 5,265,822 | A | 11/1993 | Shober, Jr. et al. | |
| 5,310,056 | A | 5/1994 | Ball | |
| 5,509,620 | A | 4/1996 | Crews | |
| 5,513,819 | A | 5/1996 | Orange | |
| 5,638,481 | A | 6/1997 | Arnett | |
| 5,659,650 | A | 8/1997 | Arnett | |
| 5,755,391 | A * | 5/1998 | Sacconi | A01K 89/016 242/312 |
| 5,785,266 | A * | 7/1998 | Bowersox | A01K 89/0111 242/128 |
| 5,791,590 | A | 8/1998 | Zuk et al. | |
| 5,911,378 | A * | 6/1999 | Plestan | A01K 89/0111 242/231 |
| 5,954,294 | A * | 9/1999 | Forsner | B65H 54/58 242/601 |
| 6,082,664 | A * | 7/2000 | Phelps | A47K 10/38 242/560 |
| 6,305,958 | B1 * | 10/2001 | Maegawa | B60R 16/027 439/15 |
| 6,712,300 | B2 * | 3/2004 | Carlebach | A01K 89/0111 242/318 |
| 6,714,710 | B2 | 3/2004 | Gimblet | |
| 6,866,213 | B2 | 3/2005 | Lake et al. | |
| 7,116,885 | B2 | 10/2006 | Brown et al. | |
| 7,264,402 | B2 | 9/2007 | Theuerkorn et al. | |
| 7,333,708 | B2 | 2/2008 | Blackwell, Jr. et al. | |
| 7,346,253 | B2 | 3/2008 | Bloodworth et al. | |
| 7,397,997 | B2 | 7/2008 | Ferris et al. | |
| 7,400,814 | B1 | 7/2008 | Hendrickson et al. | |
| 7,512,304 | B2 | 3/2009 | Granvall et al. | |
| 7,522,806 | B2 | 4/2009 | Hendrickson et al. | |
| 7,546,018 | B2 | 6/2009 | Hendrickson et al. | |
| 7,715,679 | B2 | 5/2010 | Kowalczyk et al. | |
| 7,720,343 | B2 | 5/2010 | Barth et al. | |
| 7,748,660 | B2 | 7/2010 | Hendrickson et al. | |
| 7,756,379 | B2 | 7/2010 | Kowalczyk et al. | |
| 7,869,682 | B2 | 1/2011 | Kowalczyk et al. | |
| 7,894,701 | B2 | 2/2011 | Kowalczyk et al. | |
| 8,727,262 | B2 | 5/2014 | Underbrink et al. | |
| 9,042,700 | B2 | 5/2015 | Smith et al. | |
| 9,555,999 | B2 | 1/2017 | Smith et al. | |
| 2003/0136868 | A1 * | 7/2003 | Carlebach | A01K 89/0111 242/322 |
| 2004/0061011 | A1 * | 4/2004 | Gilmore | A01K 89/016 242/317 |
| 2004/0218887 | A1 | 11/2004 | Brown et al. | |
| 2005/0213920 | A1 | 9/2005 | Tanaka et al. | |
| 2006/0068633 | A1 | 3/2006 | Murano | |
| 2006/0093303 | A1 | 5/2006 | Reagan et al. | |
| 2006/0191395 | A1 * | 8/2006 | Jesse | A01D 34/90 83/698.41 |
| 2007/0074403 | A1 * | 4/2007 | Robison | A01D 34/416 30/276 |
| 2008/0037945 | A1 * | 2/2008 | Gniadek | B65H 49/20 385/135 |
| 2008/0282513 | A1 * | 11/2008 | Richardson | B65D 63/10 24/17 A |
| 2009/0060441 | A1 | 3/2009 | Kowalczyk et al. | |
| 2009/0136197 | A1 | 5/2009 | Jensen et al. | |
| 2009/0152390 | A1 * | 6/2009 | Underbrink | B65H 49/24 242/432.6 |
| 2009/0317047 | A1 | 12/2009 | Smith et al. | |
| 2010/0166376 | A1 | 7/2010 | Nair et al. | |
| 2010/0247051 | A1 | 9/2010 | Kowalczyk et al. | |
| 2010/0276929 | A1 | 11/2010 | Jansen | |
| 2011/0091180 | A1 | 4/2011 | Kowalczyk et al. | |
| 2011/0158599 | A1 | 6/2011 | Kowalczyk et al. | |
| 2011/0280525 | A1 | 11/2011 | Marcouiller et al. | |

FOREIGN PATENT DOCUMENTS

| | | |
|---|---|---|
| JP | 5-61178 | 8/1993 |
| JP | 07-172706 | 7/1995 |
| JP | 10-129938 | 5/1998 |
| WO | 94/22755 | 10/1994 |

(56) References Cited

FOREIGN PATENT DOCUMENTS

WO        WO 9422755 A1 * 10/1994 ............. B65H 75/14
WO        2006050505      5/2006

OTHER PUBLICATIONS

European Search Report for Application 11815170.3, dated Sep. 24, 2014, 7 pages.
Fiber Distribution Frame Pre-Terminated Rear Load Connector Module Installation Instructions. ADC Telecommunications, Inc., Feb. 2000, pp. 1-8.
Fiber Main Distribution Frame (FMDF) Fiber Terminal Block Installation Instructions. ADC Telecommunications, Inc., Jan. 2001, pp. 1-15.
IFC Style Frame Modules, ADC Telecommunications, Inc., copyright 1995, "Connector Module Equipped with IFC", 1 page.
PCT International Search Report in Application PCT/US2011/046228, dated Mar. 19, 2012.
Rear Load Frame Modules, ADC Telecommunications, Inc., copyright 1998, "Connector Module Equipped with IFC", 1 page.

* cited by examiner

CABLE SPOOL ASSEMBLY

CROSS-REFERENCE TO RELATED APPLICATIONS

This application is a continuation of U.S. patent application Ser. No. 14/720,091, filed May 22, 2015, now U.S. Pat. No. 9,555,999, which is a continuation of U.S. patent application Ser. No. 13/195,939, filed Aug. 2, 2011, now U.S. Pat. No. 9,042,700, which claims priority to and the benefit of U.S. Provisional Patent Application No. 61/370,070, filed Aug. 2, 2010, entitled "Cable Spool Assembly"; and U.S. Provisional Patent Application No. 61/488,572, filed May 20, 2011, entitled "Cable Spool Assembly"; the disclosures of which are hereby incorporated by reference in their entireties.

SUMMARY

An aspect of the present disclosure relates to a spool assembly. The spool assembly includes a drum having a first axial end and an oppositely disposed second axial end. The drum includes an inner surface that defines a bore that extends through the first and second axial ends. A drum support is disposed in the bore of the drum. The drum support includes a first end and an oppositely disposed second end. The drum support has an exterior surface. The exterior surface of the drum support and the inner surface of the drum define a plurality of channels. A first flange is engaged to the first end of the drum support. A second flange is engaged to the second end of the drum support.

Another aspect of the present disclosure relates to a cable spool assembly. The cable spool assembly includes a spool assembly having a first spooling portion and a second spooling portion. The first spooling portion includes a drum having a first axial end and an oppositely disposed second axial end. The drum includes an inner surface that defines a bore that extends through the first and second axial ends. A drum support is disposed in the bore of the drum. The drum support includes a first end and an oppositely disposed second end. The drum support has an exterior surface. The exterior surface of the drum support and the inner surface of the drum define a plurality of gaps. A first flange is engaged to the first end of the drum support. A second flange is engaged to the second end of the drum support. The second spooling portion includes a second drum having a first end and an oppositely disposed second end. The first end is engaged to the second flange. A third flange is engaged to the second end of the second drum. A cable is disposed about the first and second spooling portions of the spool assembly.

Another aspect of the present disclosure relates to a method of deploying cable from a cable spool assembly. The method includes deploying a first length of cable from a spool assembly. A first flange of the spool assembly is removed. A cable tie is inserted between a drum support and a drum of the spool assembly. A remaining length of cable is secured to the drum.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based. The drum and the remaining length of cable are removed from the spool assembly.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
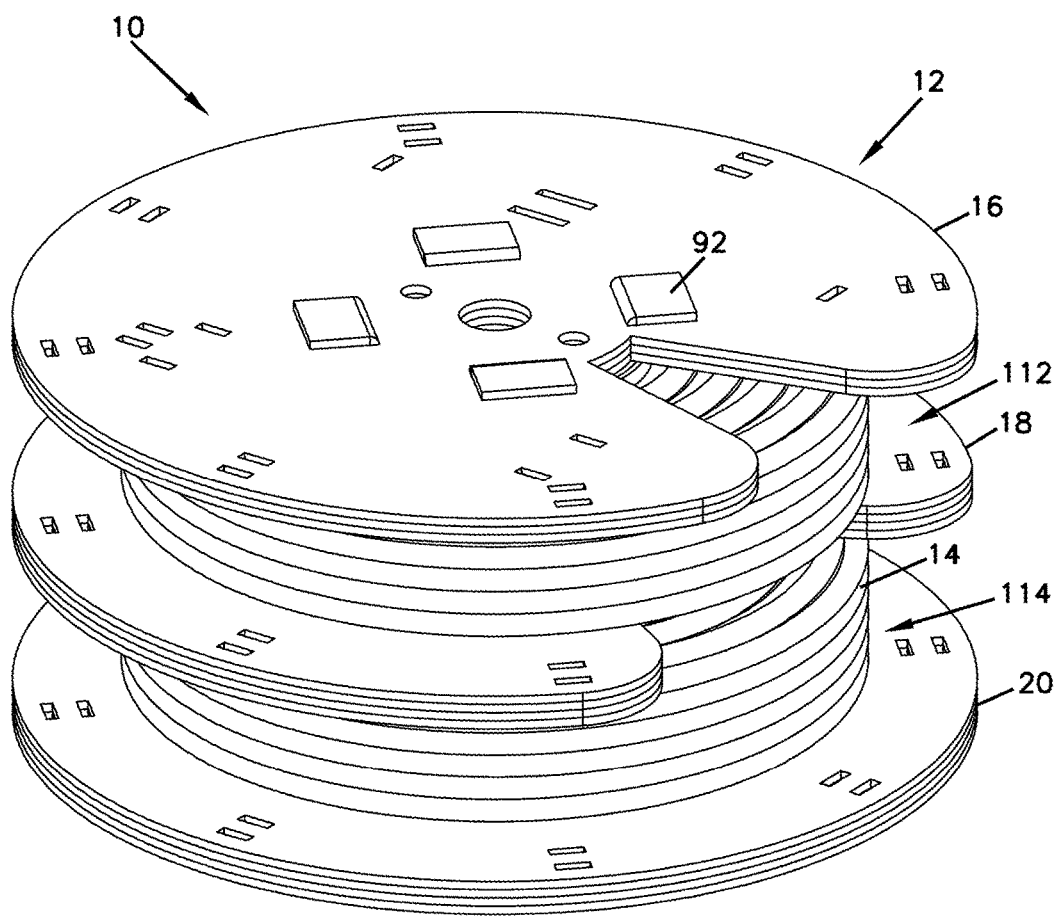
FIG. 1 is an isometric view of a cable spool assembly having exemplary features of aspects in accordance with the principles of the present disclosure.
Figure 2:
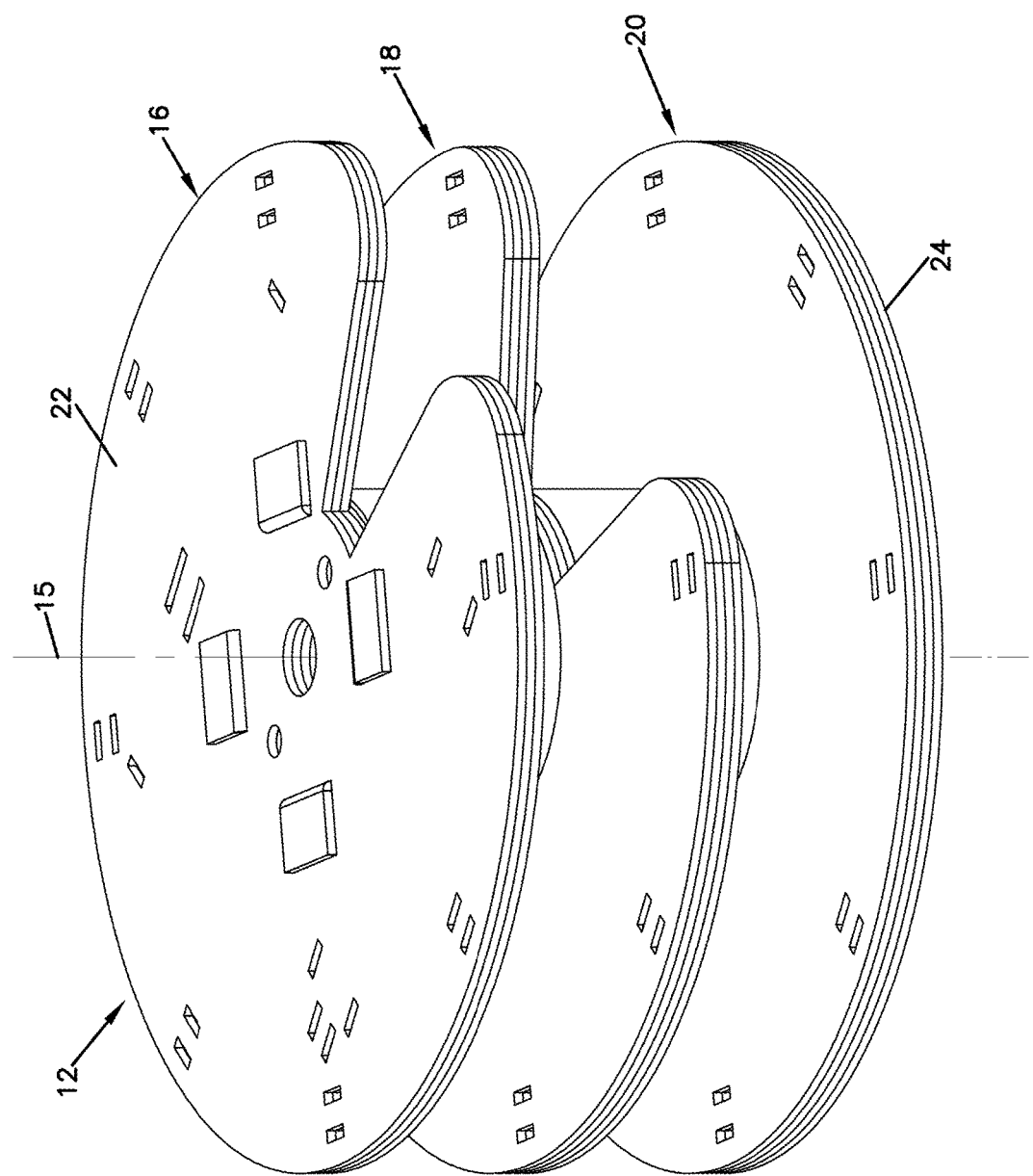
FIG. 2 is an isometric view of a spool assembly suitable for use with the cable spool assembly of FIG. 1.
Figure 3:
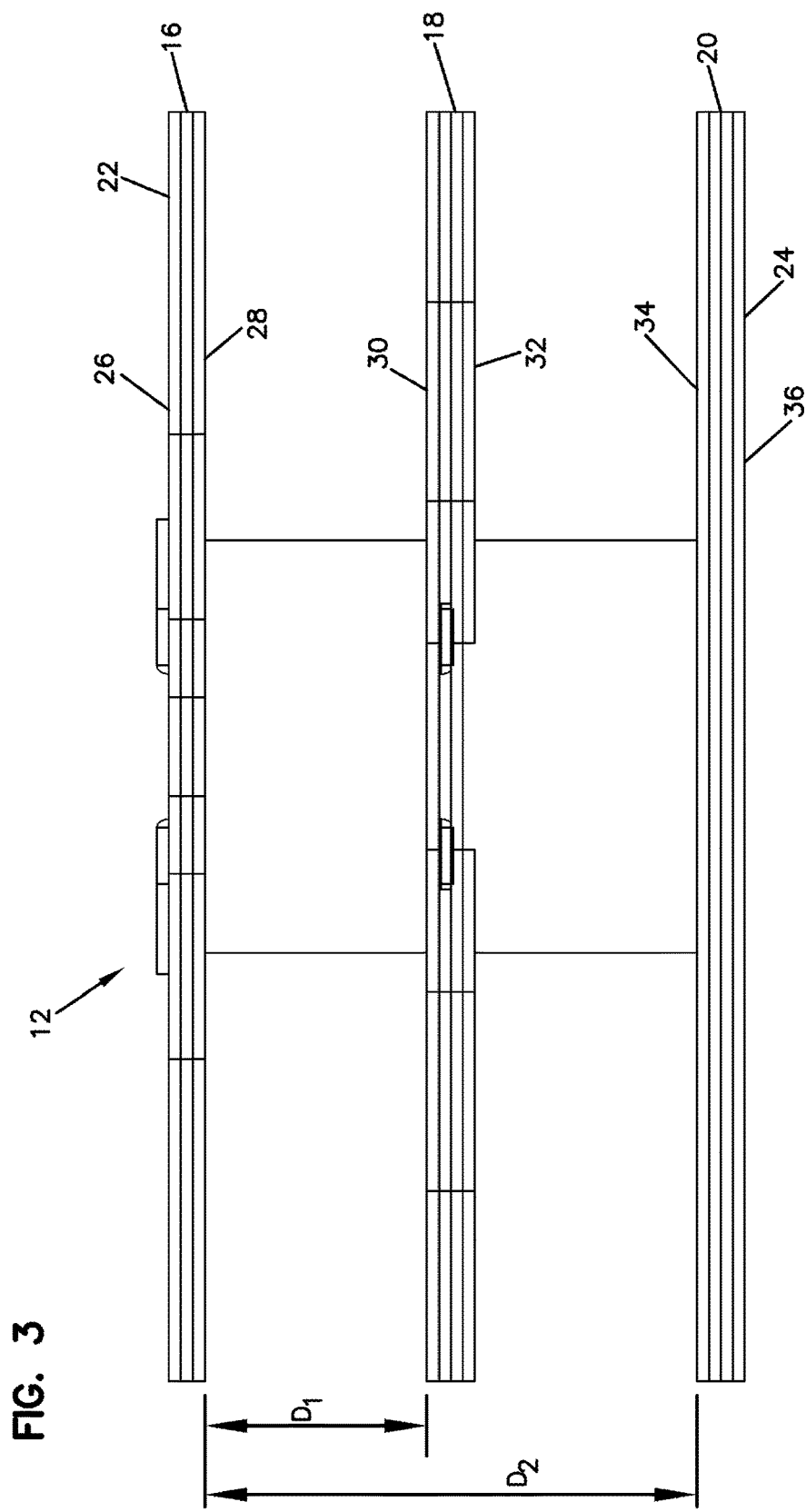
FIG. 3 is a side view of the spool assembly of FIG. 2.

Referring now to FIG. 1, a cable spool assembly 10 is shown. The cable spool assembly 10 includes a spool assembly 12 and a cable 14 disposed about the spool assembly 12. In the depicted embodiment, the cable 14 is a fiber optic cable having a plurality of optical fibers surrounded by an outer jacket.

Referring now to FIGS. 2-5, the spool assembly 12 is shown. The spool assembly 12 defines a central longitudinal axis 15 that extends through the spool assembly 12. The spool assembly 12 includes a first flange 16 and a second flange 18. In one embodiment, the spool assembly 12 further includes a third flange 20. The first, second and third flanges 16, 18, 20 are disposed along the central longitudinal axis 15 of the spool assembly 12. In the depicted embodiment, the first flange 16 is disposed at a first axial end 22 of the spool assembly 12 while the third flange 20 is disposed at an opposite second axial end 24.

The first flange 16 includes a first surface 26 and an oppositely disposed second surface 28. The second flange 18 includes a first surface 30 and an oppositely disposed second surface 32, while the third flange 20 includes a first surface 34 and an oppositely disposed second surface 36. In the depicted embodiment, each of the first and second surfaces of the first, second and third flanges 16, 18, 20 are generally perpendicular to the central longitudinal axis 15.

The first and third flanges 16, 20 are positioned along the central longitudinal axis 15 so that the first surface 26 of the first flange 16 and the second surface 36 of the third flange 20 face outwardly from the spool assembly 12, while the second surface 28 of the first flange 16 faces in a direction toward the first surface 34 of the third flange 20.

The second flange 18 is disposed between the first and third flanges 16, 20 along the central longitudinal axis 15. In one embodiment, the second flange 18 is disposed a distance D1 from the first flange 16 that is about half (i.e., 50%) a distance D2 from the first flange 16 to the third flange 20. In another embodiment, the distance D1 is less than or equal to about 75% of the distance D2. In another embodiment, the distance D1 is between about 25% to about 75% of the distance D2.

In the depicted embodiment, each of the first, second and third flanges 16, 18, 20 is manufactured from a paperboard material (e.g., cardboard, etc.). In one embodiment, the paperboard material is recyclable.

Each of the first, second and third flanges 16, 18, 20 includes a plurality of layers. In one aspect of the present disclosure, the layers of the first, second and third flanges 16, 18, 20 are adapted to increase the rigidity of the first, second and third flanges 16, 18, 20. In the depicted embodiment, the layers associated with each of the first, second and third flanges 16, 18, 20 are secured together using an adhesive.

In the depicted embodiment, the first flange 16 includes a first layer 16a, a second layer 16b and a third layer 16c. The second layer 16b is disposed between the first and third layers 16a, 16c.

The first flange 16 defines a first groove 38 that extends through the first and second surfaces 26, 28 of the first flange 16. The first groove 38 extends inward from an outer edge 40 of the first flange 16. The first groove 38 has a width that decreases as the first groove 38 extends inward from the outer edge 40. In the depicted embodiment, the first groove 38 tapers inwardly as the first groove 38 extends inward from the outer edge 40.

The first flange 16 further defines a first plurality of slots 42 disposed about a central opening 44 of the first flange 16. The slots 42 extend through the first and second surfaces 26, 28 of the first flange 16. In the depicted embodiment, there are four slots 42 that are symmetrically disposed about the central opening 44.

Each of the first and second layers 16a, 16b of the first flange 16 defines a first plurality of openings 46, a second plurality of openings 48 and a third plurality of openings 50. The openings 46, 48, 50 are adapted to receive securing strips (e.g., cable ties, Velcro strips, etc.) for securing hardware to the first surface 26 of the first flange 16.

The third layer 16c defines a first recess 52, a second recess 54 and a third recess 56. In the depicted embodiment, the first, second and third recesses 52, 54, 56 extend through the third layer 16c. The first recess 52 is generally aligned with the first plurality of openings 46 through the first and second layers 16a, 16b. The second recess 54 is generally aligned with the second plurality of openings 48 while the third recess 56 is generally aligned with the third plurality of openings 50. The first, second and third recesses 52, 54, 56 are adapted to receive a portion of the securing strips and to prevent the securing strips from interfering with the cable 14 disposed about the spool assembly 12.

The second flange 18 defines a second groove 58 that extends through the first and second surfaces 30, 32 of the second flange 18. The second groove 58 extends inward from an outer edge 60 of the second flange 18. The second groove 58 has a width that decreases as the second groove 58 extends inward from the outer edge 60. In the depicted embodiment, the second groove 58 tapers inwardly as the second groove 58 extends inward from the outer edge 60. In the depicted embodiment, the second groove 58 is wider than the first groove 38 of the first flange 16.

A first layer 18a of the second flange 18 includes a second plurality of slots 62 that are disposed about a center opening 64a that extends through the first layer 18a of the second flange 18. The second plurality of slots 62 extend through the first layer 18a of the second flange 18. In the depicted embodiment, there are four slots 62 that are symmetrically disposed about the center opening 64.

A second layer 18b of the second flange 18 is engaged to the first layer 18a of the second flange 18. The second layer 18b includes a center opening 64b having an inner diameter. The inner diameter of the center opening 64b is sized so that the second plurality of slots 62 of the first layer 18a is positioned within the inner diameter.

A third layer 18c of the second flange 18 is engaged to the second layer 18b. The third layer 18c defines a center opening 64c that is similar in size to the center opening 64a of the first layer 18a.

A fourth layer 18d of the second flange 18 is engaged to the third layer 18c. The fourth layer 18d defines a center opening 64d. An inner diameter of the center opening 64d is greater than the inner diameter of the center opening 64a of the first layer 18a and less than the inner diameter of the center opening 64b of the second layer 18b.

The third flange 20 includes a first layer 20a, a second layer 20b, a third layer 20c and a fourth layer 20d. The first layer 20a defines a central opening 66. In the depicted embodiment, the central opening 66 is generally similar in size to the center opening 64c of the third layer 18c of the second flange 18. In the depicted embodiment, the second, third and fourth layers 20b-d are similar in structure. The second, third and fourth layers 20b-d define a central opening 68 that has an inner diameter that is less than the inner diameter of the central opening 66 through the first layer 20a of the third flange 20.

Each of the layers 16a-c, 18a-d, 20a-d of each of the first, second and third flanges 16, 18, 20 define a plurality of tie-off slots 70 disposed at an outer periphery of each of the flanges 16, 18, 20. The tie-off slots 70 are symmetrically arranged on the flanges 16, 18, 20.

The spool assembly 12 further includes a drum assembly 72 disposed between the first and second flanges 16, 18. The drum assembly 72 includes a drum 74 and a drum support 76.

The drum 74 is generally cylindrical in shape. The drum 74 includes a first axial end 78 and an oppositely disposed second axial end 80. The drum 74 includes an inner surface 81 that defines a bore 82. The bore 82 extends through the first and second axial ends 78, 80. In the depicted embodiment, the drum 74 is not directly secured to the first and second flanges 16, 18.

The drum support 76 is disposed in the bore 82 of the drum 74. The drum support 76 includes an exterior surface 83 having a first end 84 and an oppositely disposed second end 86.

A first plurality of tabs 88 extends outwardly from the first end 84. The first plurality of tabs 88 is adapted to prevent the drum support 76 from rotating relative to the first flange 16. Each of the tabs 88 includes a base end 90 and an oppositely disposed free end 92. The base ends 90 are engaged to the first end 84 of the drum support 76. The free ends 92 of the tabs 88 are adapted to be received through the first plurality of slots 42 defined by the first flange 16.

A second plurality of tabs 94 extends outwardly from the second end 86 of the drum support 76. The second plurality of tabs 94 is adapted to prevent the drum support 76 from rotating relative to the second flange 18. Each of the tabs 94 includes a base end 96 and an oppositely disposed free end 98. The base ends 96 are engaged to the second end 86 of the drum support 76. The free ends 98 are adapted to be received through the second plurality of slots 62 defined by the second flange 18.

The exterior surface 83 includes a plurality of flats 100 that extend the length of the exterior surface 83. The flats 100 of the exterior surface 83 are configured so that the drum support 76 has a generally polygonal cross-section. In the depicted embodiment, the drum support 76 has a generally octagonal cross-section.

The exterior surface 83 includes a plurality of longitudinal outer edges 102. In the depicted embodiment, the longitudinal outer edges 102 are disposed between adjacent flats 100. In one embodiment, a circle that circumscribes the longitudinal outer edges 102 of the exterior surface 83 has an outer diameter that is slightly less than an inner diameter of the bore 82 of the drum 74.

Figure 6:
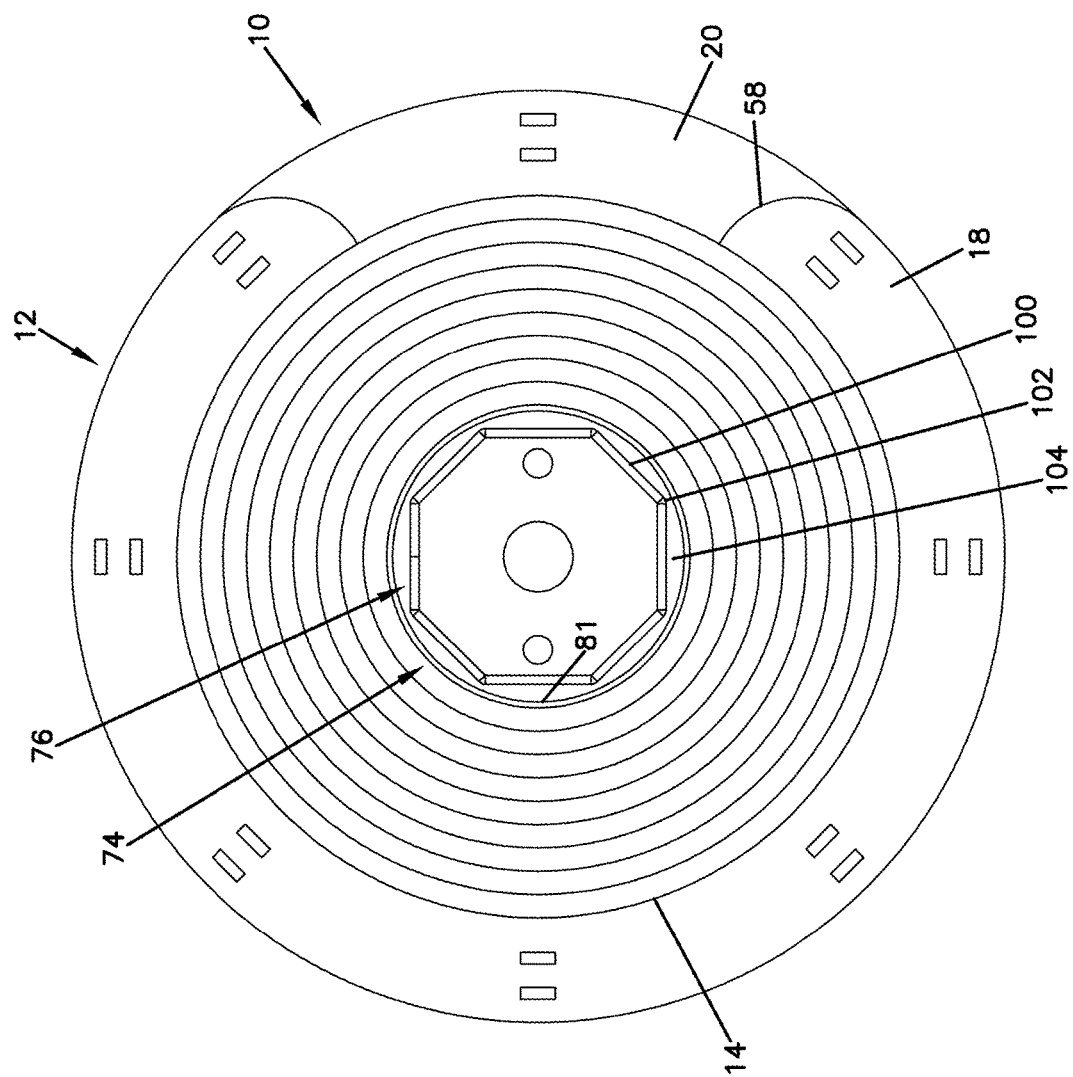
FIG. 6 is a cross-sectional view of the cable spool assembly taken through a first spooling portion.
Figure 7:
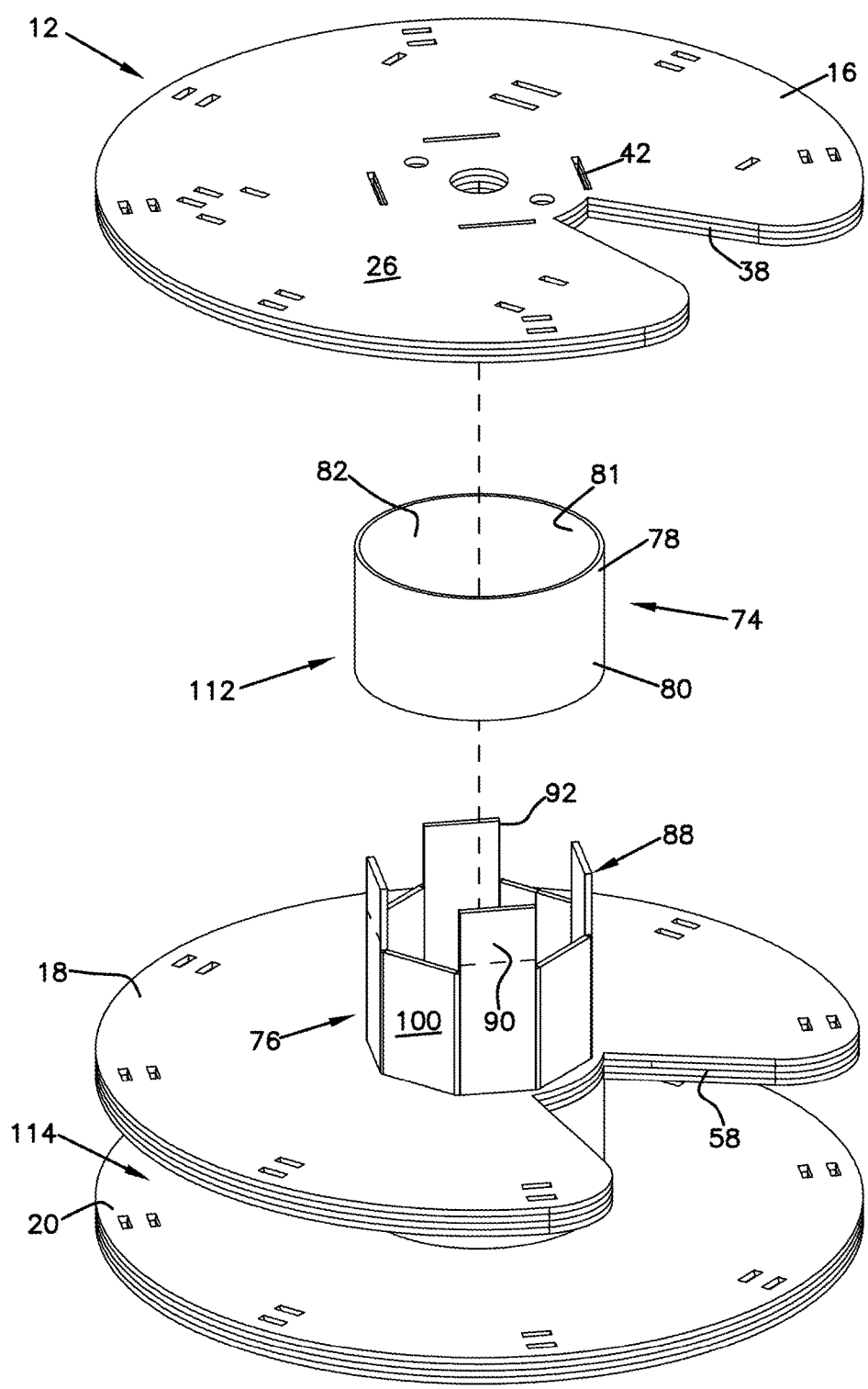
FIG. 7 is a partially exploded isometric view of the spool assembly of FIG. 2.

Referring now to FIG. 6, the drum 74 and the drum support 76 form a plurality of gaps 104 disposed between the plurality of flats 100 and the bore 82 of the drum 74. The gaps 104 are sized to receive a securing device (e.g., cable tie, hook-and-loop or Velcro™ strip, etc.) for securing the cable 14 to the drum 74.

Figure 4:
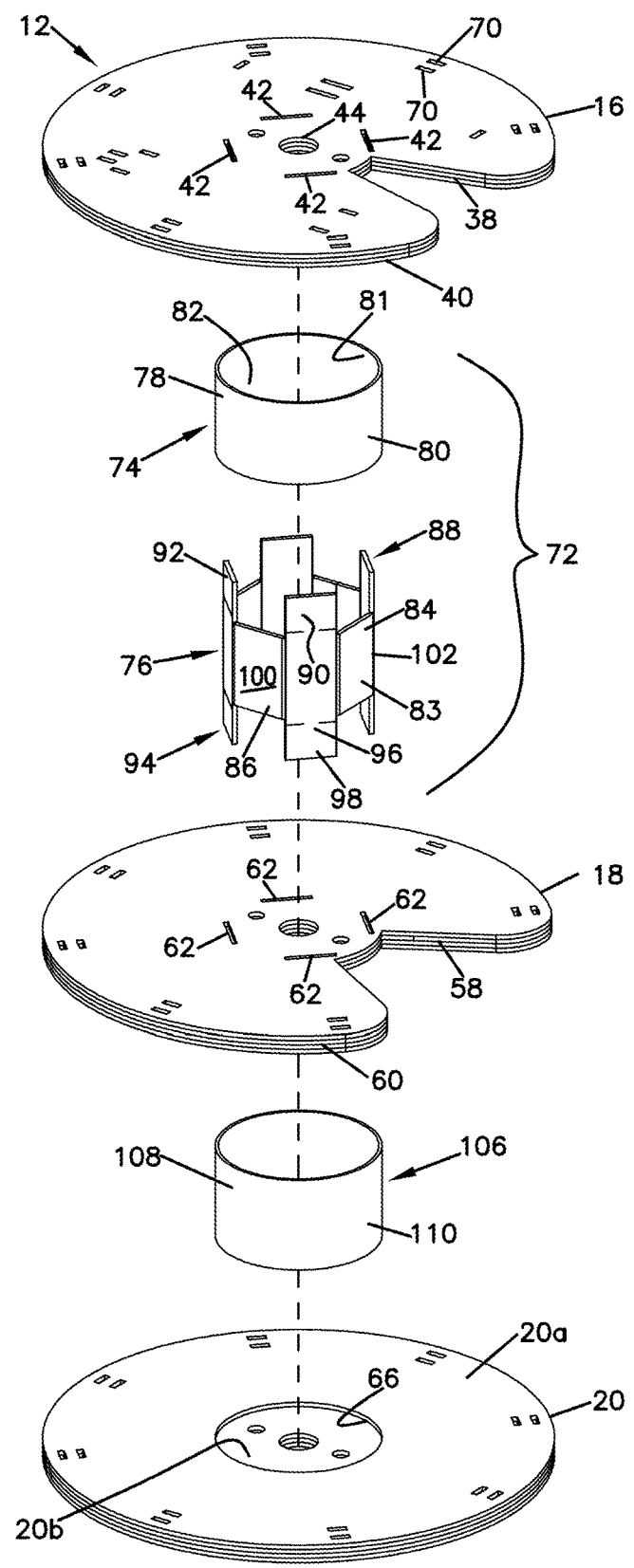
FIG. 4 is an exploded isometric view of the spool assembly of FIG. 2.
Figure 5:
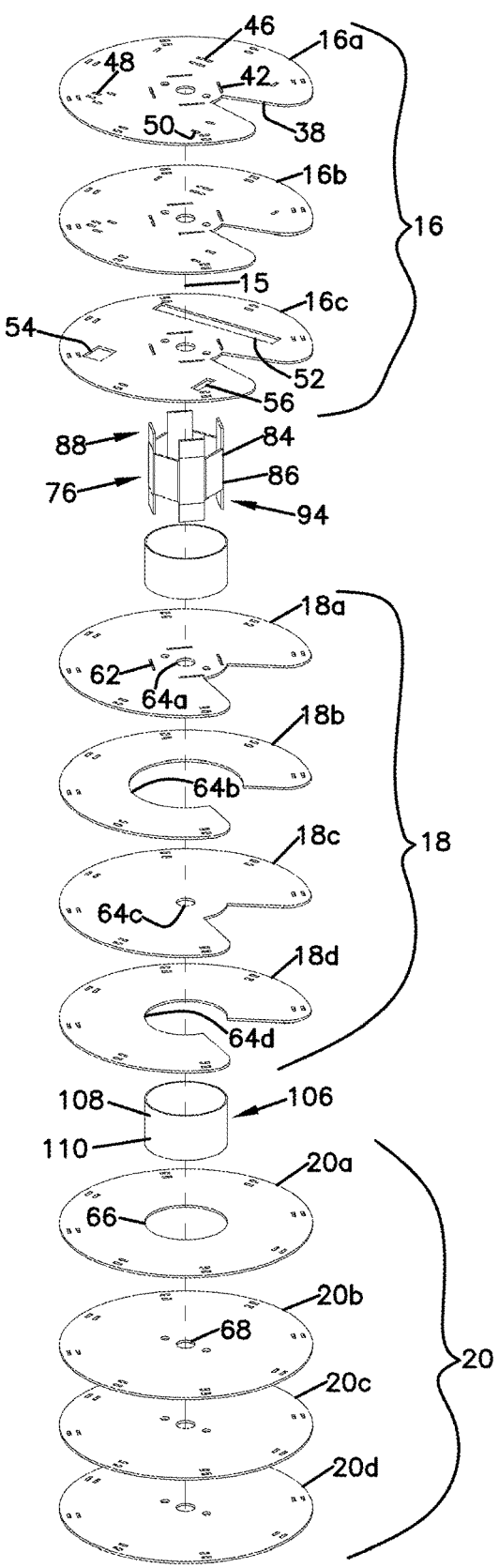
FIG. 5 is an exploded isometric view of the spool assembly of FIG. 2.

Referring now to FIGS. 4 and 5, the spool assembly 12 further includes a second drum 106 disposed between the second and third flanges 18, 20. In the depicted embodiment, the second drum 106 is generally cylindrical in shape.

The second drum 106 includes a first end 108 and an opposite second end 110. The first end 108 includes an outer diameter that is adapted to be received through the center opening 64*d* of the fourth layer 18*d* of the second flange 18. In the depicted embodiment, the first end 108 abuts the third layer 18*c* of the second flange 18. The first end 108 is secured to the second flange 18 by adhesive. In the depicted embodiment, adhesive is applied to the first end 108 and to the outer diameter of the first end 108 so that the first end 108 of the drum 106 is secured to the third layer 18*c* and to the center opening 64*d* of the fourth layer 18*d*.

The second end 110 includes an outer diameter that is adapted to be received through the central opening 66 of the first layer 20*a* of the third flange 20. The second end 110 abuts the second layer 20*b* of the third flange 20. The second end 110 is secured to the third flange 20 by adhesive. In the depicted embodiment, adhesive is applied to the second end 110 and to the outer diameter of the second end 110 so that the second end 110 of the drum 106 is secured to the second layer 20*b* and to the central opening 66 of the first layer 20*a*.

Referring now to FIGS. 2, 4, 5, 7 and 8, the assembly of the spool assembly 10 will be described. The drum 74 is disposed over the drum support 76 so that the drum support 76 is disposed in the bore 82 of the drum 74. The first plurality of tabs 88 of the drum support 76 is inserted through the first plurality of slots 42 of the first flange 16. With the tabs 88 positioned through the slots 42, the free ends 92 of the tabs 88 are bent toward the first surface 26 of the first flange 16. In one embodiment, adhesive is applied between the free ends 92 of the tabs 88 and the first surface 26 of the first flange 16 to secure the free ends 92 in position.

The second plurality of tabs 94 of the second end 86 of the drum support 76 is inserted through the second plurality of slots 62 of the first layer 18*a* of the second flange 18. With the tabs 94 positioned through the slots 62, the free ends 98 of the tabs 94 are bent toward the first layer 18*a* so that the first layer 18*a* is captured between the second end 86 and the free ends 98 of the drum support 76. In one embodiment, adhesive is applied between the free ends 98 and the first layer 18 to secure the free ends 98 in position.

The second layer 18*b* of the flange 18 is secured to the first layer 18*a*. The center opening 64*b* of the second layer 18*b* is sized so that the material of the second layer 18*b* does not overlap the free ends 98 of the second plurality of tabs 94. With the tabs 94 secured to the second layer 18*b*, the third and fourth layers 18*c-d* are affixed to the second layer 18*b*.

The second drum 106 is secured to the second and third flanges 18, 20 using an adhesive. In the depicted embodiment, the first end 108 of the second drum 106 is secured to the third layer 18*c* of the second flange 18 while the second end 110 is secured to the second layer 20*b* of the third flange 20.

Referring now to FIGS. 1-6, a method of coiling cable 14 about the spool assembly 12 will be described. The cable spool assembly 10 includes a first spooling portion 112 and a second spooling portion 114. The first spooling portion 112 is disposed between the first and second flanges 16, 18 of the spool assembly 12 while the second spooling portion 114 is disposed between the second and third flanges 18, 20.

To coil cable 14 about the spool assembly 12, a first portion 14*a* of the cable 14 is first coiled around the drum assembly 72. With the first portion 14*a* of the cable 14 coiled about the drum assembly 72 in the first spooling portion 112, the cable 14 passes through the second groove 58 of the second flange 18 and is coiled around the drum 106 in the second spooling portion 114. An end of the cable 14 can be secured to the third flange 20 at one of the tie-off slots 70 disposed at the outer periphery of the third flange 20.

Referring now to FIGS. 1-9, a method for deploying cable 14 from the cable spool assembly 10 will be described. In one embodiment, the cable spool assembly 10 is mounted at a mounting location so that the cable spool assembly 10 can rotate about the central longitudinal axis 15.

A total length of cable 14 is disposed about the first and second spooling portions 112, 114 of the spool assembly 12. A first length of cable 14 is deployed from the cable spool assembly 10. The first length of cable 14 is less than the total length of cable 14. In one embodiment, the first length of cable 14 is greater than or equal to the cable 14 disposed about the second spooling portion 114 of the spool assembly 12. The first length of cable 14 is deployed first from the second spooling portion 114 of the spool assembly 12.

If the first length of cable 14 is greater than the amount disposed about the second spooling portion 114, the cable 14 passes through the second groove 58 of the second flange 18 as the first length of cable 14 is being deployed. With the first length of cable 14 deployed, a second length of cable 14 is disposed in the first spooling portion 112 of the spool assembly 12. The second length of cable 14 is a remaining length of cable. The second length of cable 14 can be stored for later use.

Figure 8:
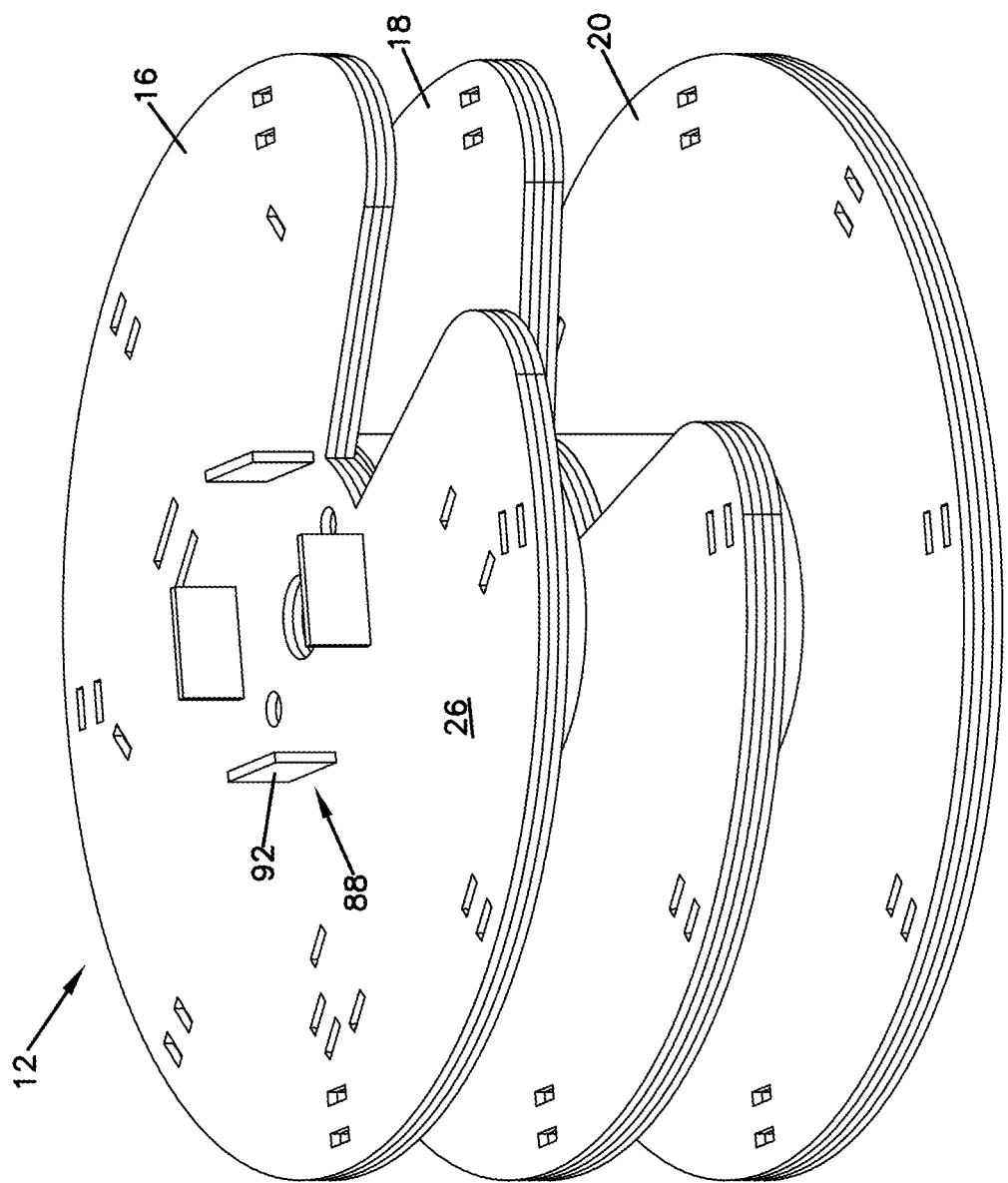
FIG. 8 is an isometric view of the spool assembly with free ends of tabs in an upright position.
Figure 9:
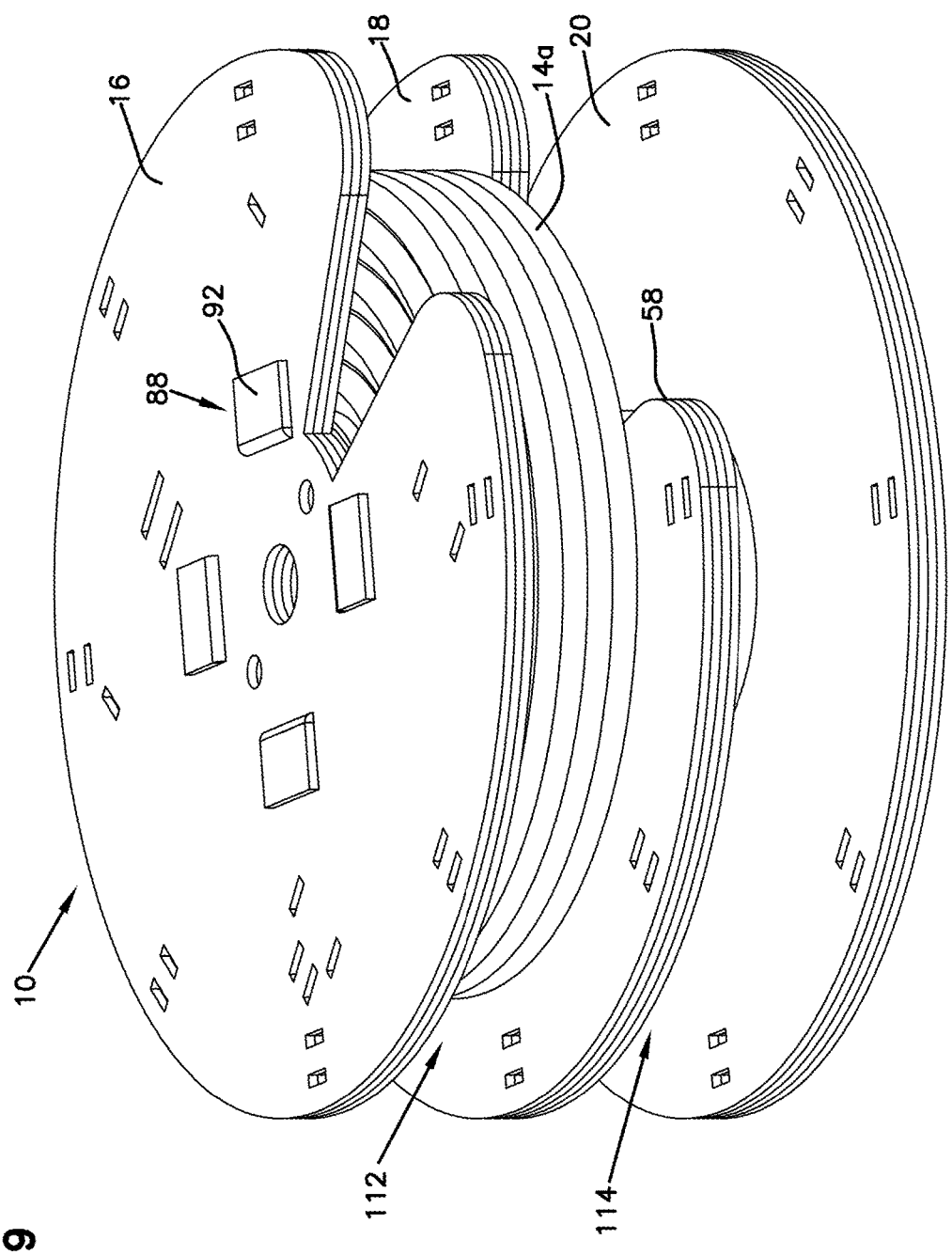
FIG. 9 is an isometric view of a second length of cable disposed in the first spooling portion of the spool assembly.

With the second length of cable 14 disposed in the first spooling portion 112 of the spool assembly 12, the free ends 94 of the tabs 88 of the drum support 76 are lifted from the bent position (shown in FIG. 1) to an upright position (shown in FIG. 8). The first flange 16 is removed from the spool assembly 12. Alternatively, the tabs 88 can pass through slots 42 and can be folded over and affixed (e.g., glued) to the top side of the flange 16. In this embodiment, the flange 16 can be removed by cutting the tabs 88 along their fold lines to free the flange 16 and to allow the flange to be removed.

With the first flange 16 removed from the spool assembly 12, cable ties 116 are inserted between the drum 74 and the drum support 76 of the spool assembly 12. In the depicted embodiment, the cable ties 116 are inserted through the plurality of gaps (e.g., channels, pathways, etc.) 104 between the drum 74 and the drum support 76.

Figure 10:
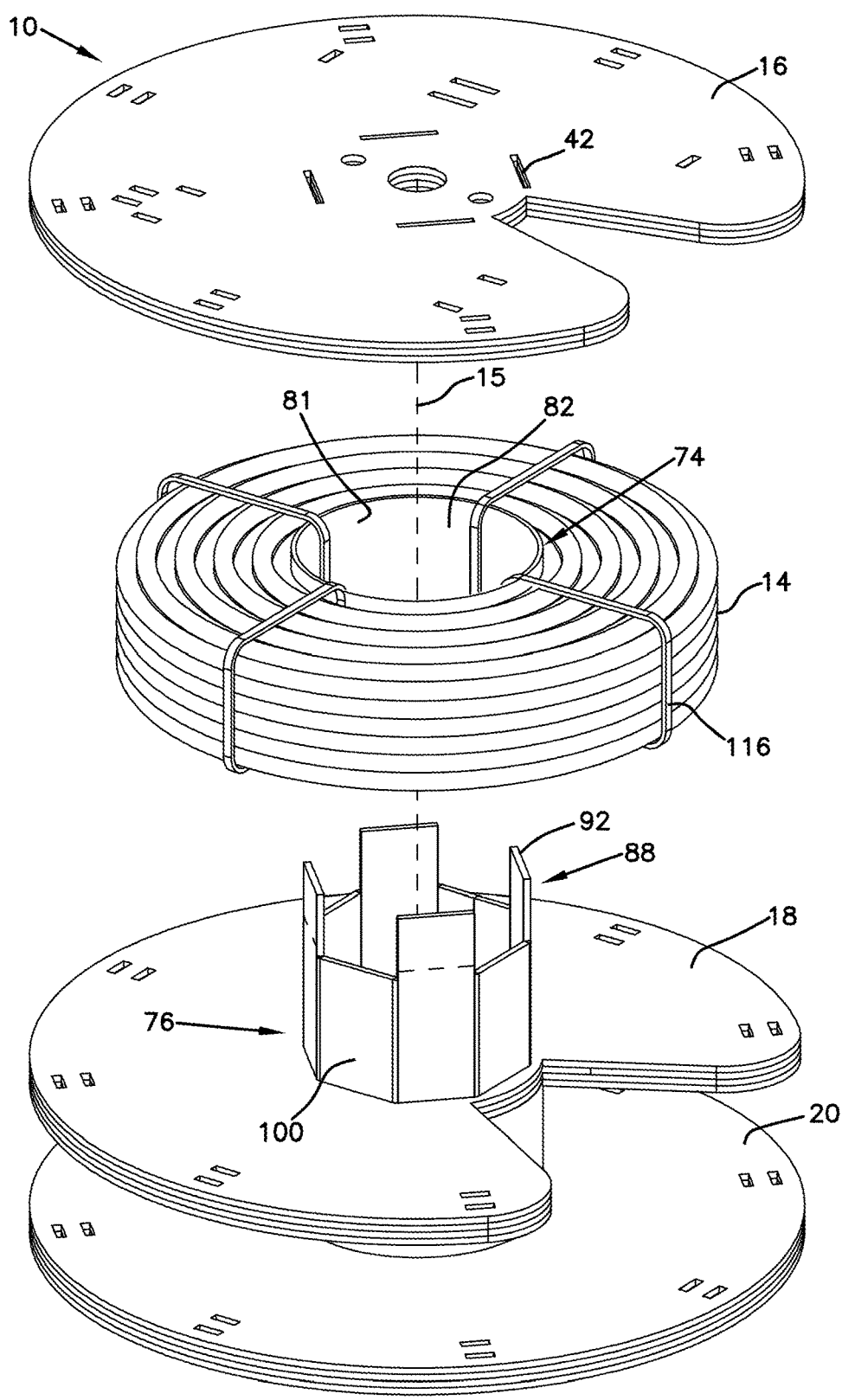
FIG. 10 is a partially exploded isometric view of the cable spool assembly.

As best shown in FIG. 10, the cable ties 116 are disposed through the bore 82 of the drum 74 and around the cable 14 wrapped about the drum 74. In the depicted embodiment of FIG. 10, four cable ties 116 are used to secure the cable 14 to the drum 74. In another embodiment, two cable ties 116 are used to secure the cable 14 to the drum 74. In another embodiment, one cable tie 116 secures the cable 14 to the drum 74.

With the cable 14 secured to the drum 74, the cable 14 and drum 74 can be removed from the drum support 76 of the spool assembly 12. The second length of cable 14, which is secured to the drum 74, can then be stored with the fiber optic equipment. In one embodiment, the second length of cable 14 and the drum 74 are stored in a hand hole.

Figure 11:
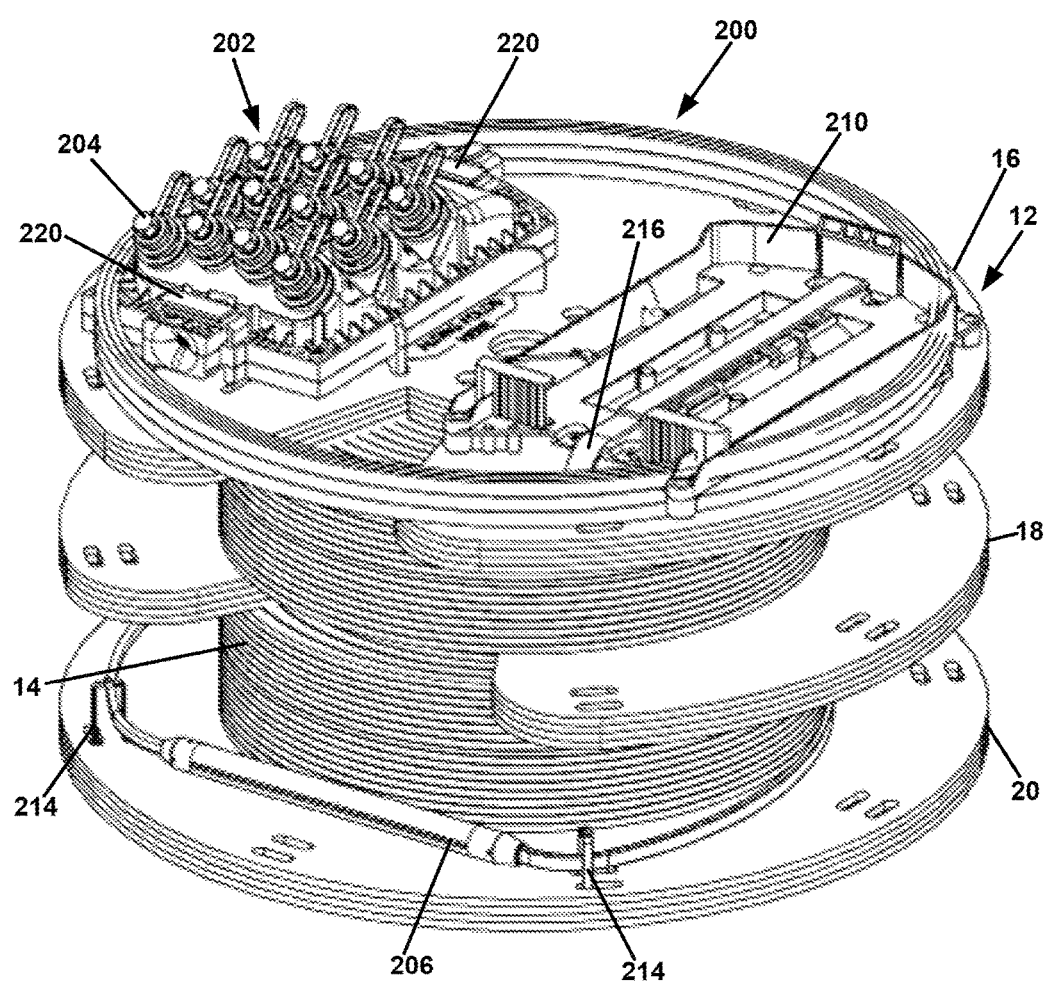
FIG. 11 is an isometric view of a drop terminal deployment system incorporating a cable spool assembly.
Figure 12:
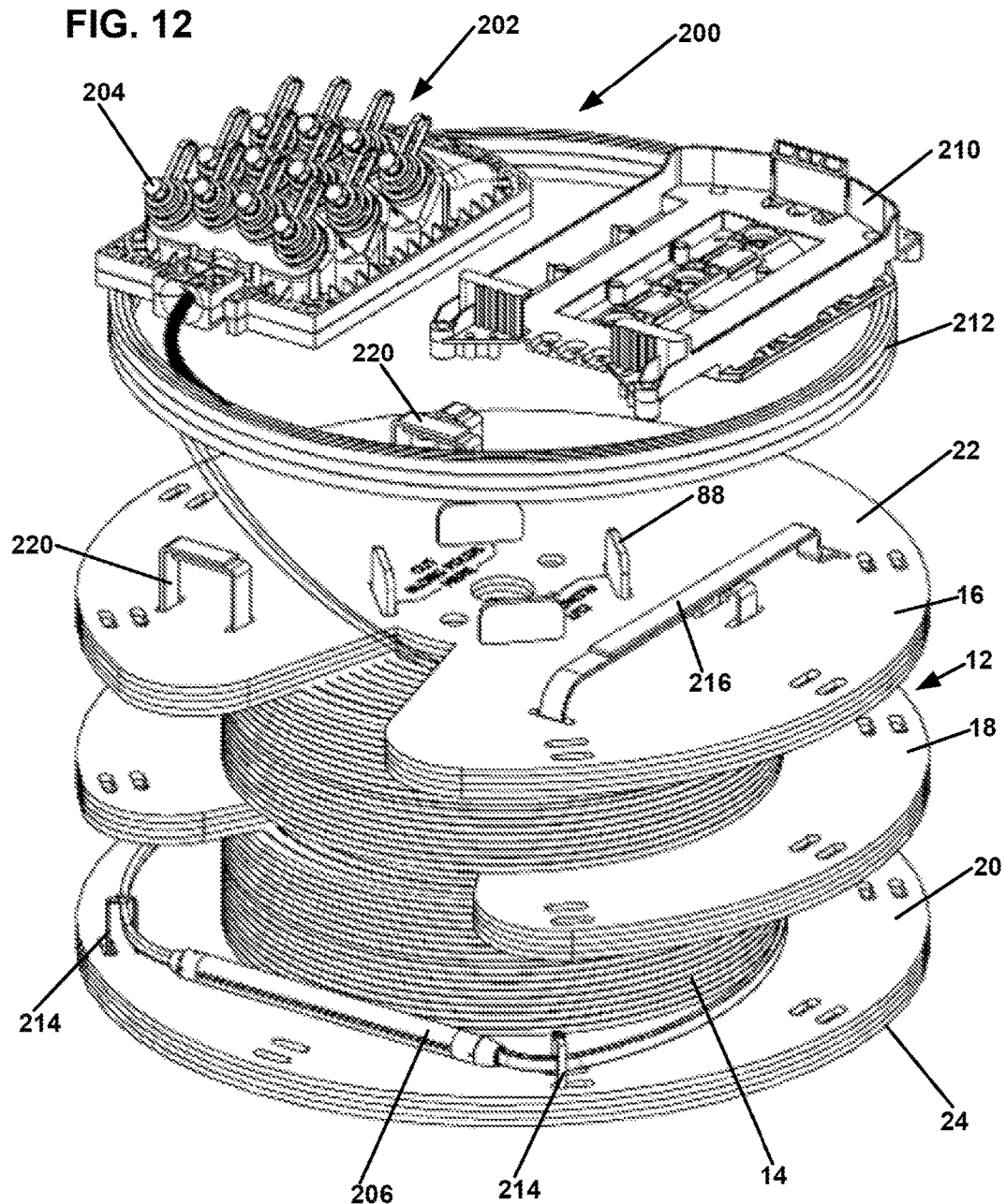
FIG. 12 is a partial exploded isometric view of the drop terminal deployment system of FIG. 11.
Figure 13:
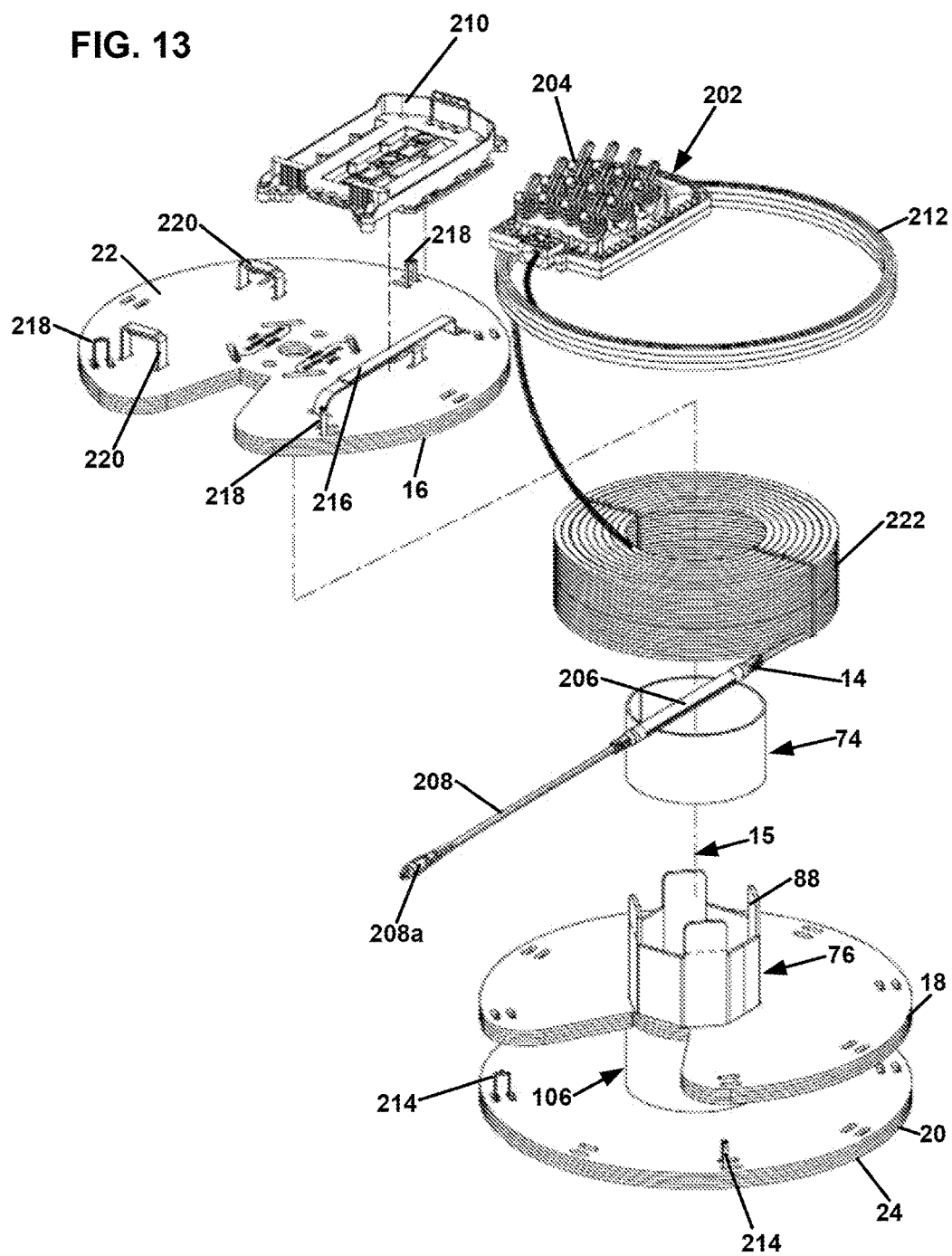
FIG. 13 is an exploded isometric view of the drop terminal deployment system of FIG. 11.

Spooling systems in accordance with the principles of the present disclosure can be used to efficiently deploy various telecommunications components (e.g., trays, drawers, wall boxes, drop terminals, etc.) in a fiber optic network. FIGS. 11-13 depict a drop terminal deployment system 200 incorporating a spool assembly 12 in accordance with the principles of the present disclosure. The drop terminal deployment system 200 has a drop terminal 202 with outside accessible fiber optic adapter ports 204 of the type described in U.S. Patent Application Publication No. 2009/0317047, the disclosure of which is hereby incorporated by reference in its entirety. The system 200 includes a multi-fiber cable 14 coiled about the spool assembly 12. At a first end of the cable 14, the optical fibers are terminated by connectors inserted within interior ports 204 of the adapters of the drop terminal 202. At a second end of the cable 14, the optical fibers are spliced to fibers of a tether 208 terminated by a multi-fiber connector 208a. The multi-fiber connector 208a can be a ruggedized multi-fiber connector as disclosed in U.S. Pat. No. 7,264,402, which is hereby incorporated by reference in its entirety. In certain embodiments, the cable forming the tether 208 can be stiffer (e.g., more rigid, less flexible) than the cable 14. In one embodiment, the cable of the tether 208 can have a construction as shown in U.S. Pat. No. 6,714,710, which is hereby incorporated by reference in its entirety. Also, the cable 14 can have a construction as shown in U.S. patent application Ser. No. 12/607,402, which is hereby incorporated by reference in its entirety. A splice enclosure 206 covers the splice interface between the main cable 14 and the tether 208. Embodiments of splice enclosures are disclosed in U.S. patent application Ser. No. 13/106,371, filed May 12, 2011, entitled "Splice Enclosure Arrangement for Fiber Optic Cables," the disclosure of which is hereby incorporated by reference herein in its entirety. The drop terminal deployment system 200 may be secured to one flange (in this case, the first flange 16) of the spool assembly 12, along with a mounting bracket 210, and a length of optical cable 212. Cable ties 214, 218 and other securing elements 216, 220 secure the cable 14 and other components to the flanges 16, 18, 20, depending on the configuration used. Additional details regarding the drop terminal deployment system 200, as well as methods for using such systems in a fiber optic network, are described below.

The drop terminal deployment system 200 is mounted on the first flange 16 in such a way as to allow rapid uncoiling of the cable 14. One embodiment of a drop terminal deployment system 200 includes an environmentally-sealed fiber optic terminal that provides a point for connecting subscriber drop cables to an optical network. The drop terminal 202 may include a two-piece plastic housing with multiple optical ports 204. Attached to the system 200 is an optical cable 14 that is connected internally to the optical ports 204. One embodiment of a drop terminal 202 is disclosed in U.S. Pat. No. 7,512,304, which is hereby incorporated by reference in its entirety.

The drop terminal deployment system 200 includes the drop terminal 202 with attached cable end portion 212, which may be an end portion of the flat optical cable 14, and the mounting bracket 210. These components are secured to a spool assembly 12 having either one or two cable spools (two spools are depicted in FIGS. 11-13). The drop terminal 202 and the mounting bracket 210 are releasably mounted on the spool top flange 16 as shown in FIG. 11. The attached cable end portion 212 is coiled on the spool flange 16 and is configured for quick deployment. Up to 2,000 feet of cable 14 may be coiled on the spools depending on the desired application. For lengths up to 1,000 feet, one spool is generally used. For lengths between 1,000 and 2,000 feet, two spools may be used. Spool assemblies having cable capacity greater than 2,000 feet are also contemplated.

Figure 15:
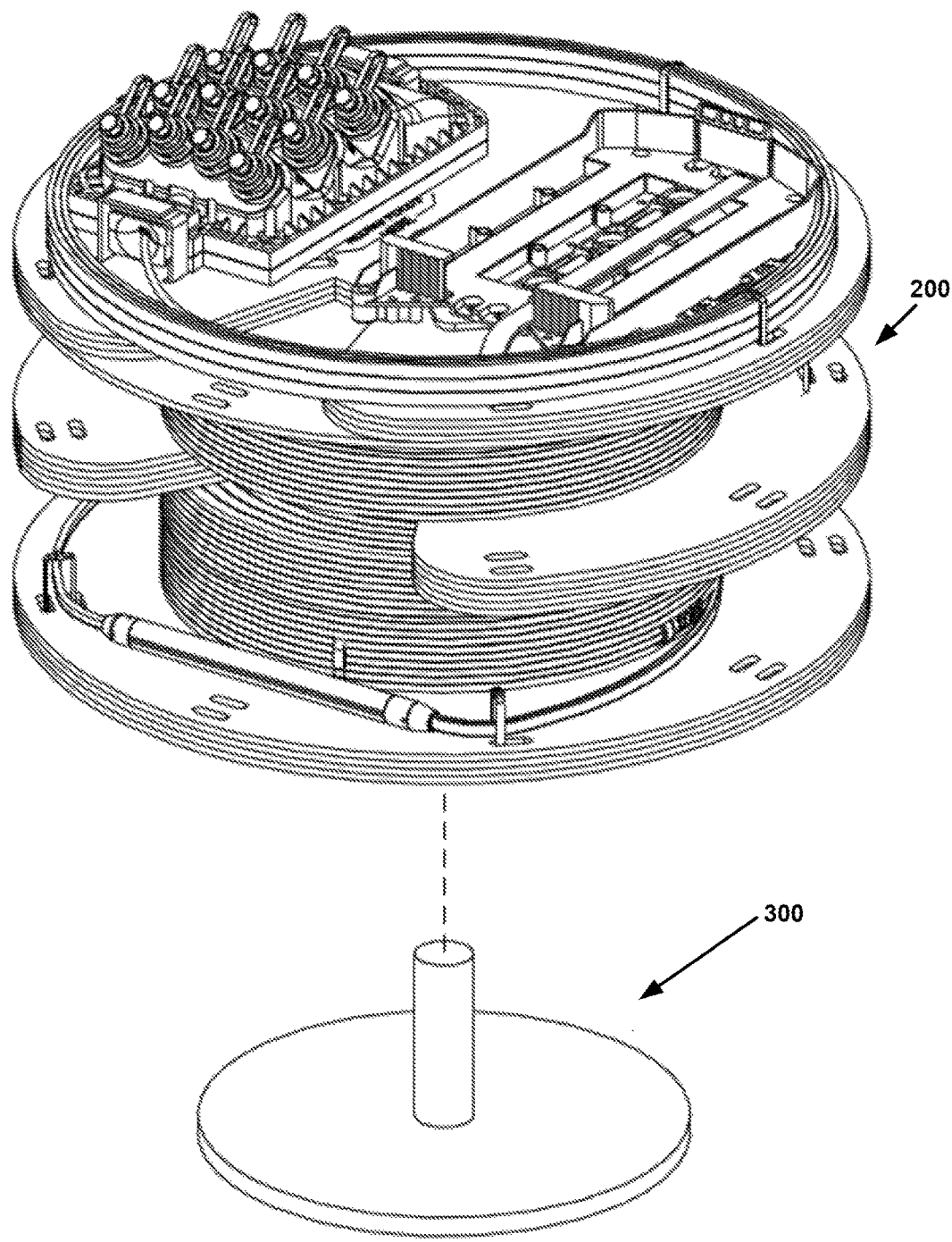
FIG. 15 shows the drop terminal deployment system of FIG. 11 positioned above a deployment carousel.

In general, to deploy the cable 14, the spool assembly 12 is first placed on a carousel 300 or similar device such as a vertical mandrel (see FIG. 15) so the assembly 12 can rotate as the cable 14 is unwound. By pulling on the first end of the cable 14 including the multi-fiber connector 208a, the cable 14 is initially pulled off the lower spool. Once the cable 14 has been fully removed from the lower spool, the cable transitions to the upper spool and begins to be fed from the upper spool. When the required length of cable 14 has been uncoiled and routed to the designated interface with the network, the drop terminal 202 and the mounting bracket 210 are removed from the spool flange 16 and mounted in a desired location. The excess cable is then removed from the upper spool of the spool assembly 12 and stored proximate the drop terminal 202. The spool assembly 12 may then be discarded.

Figure 14:
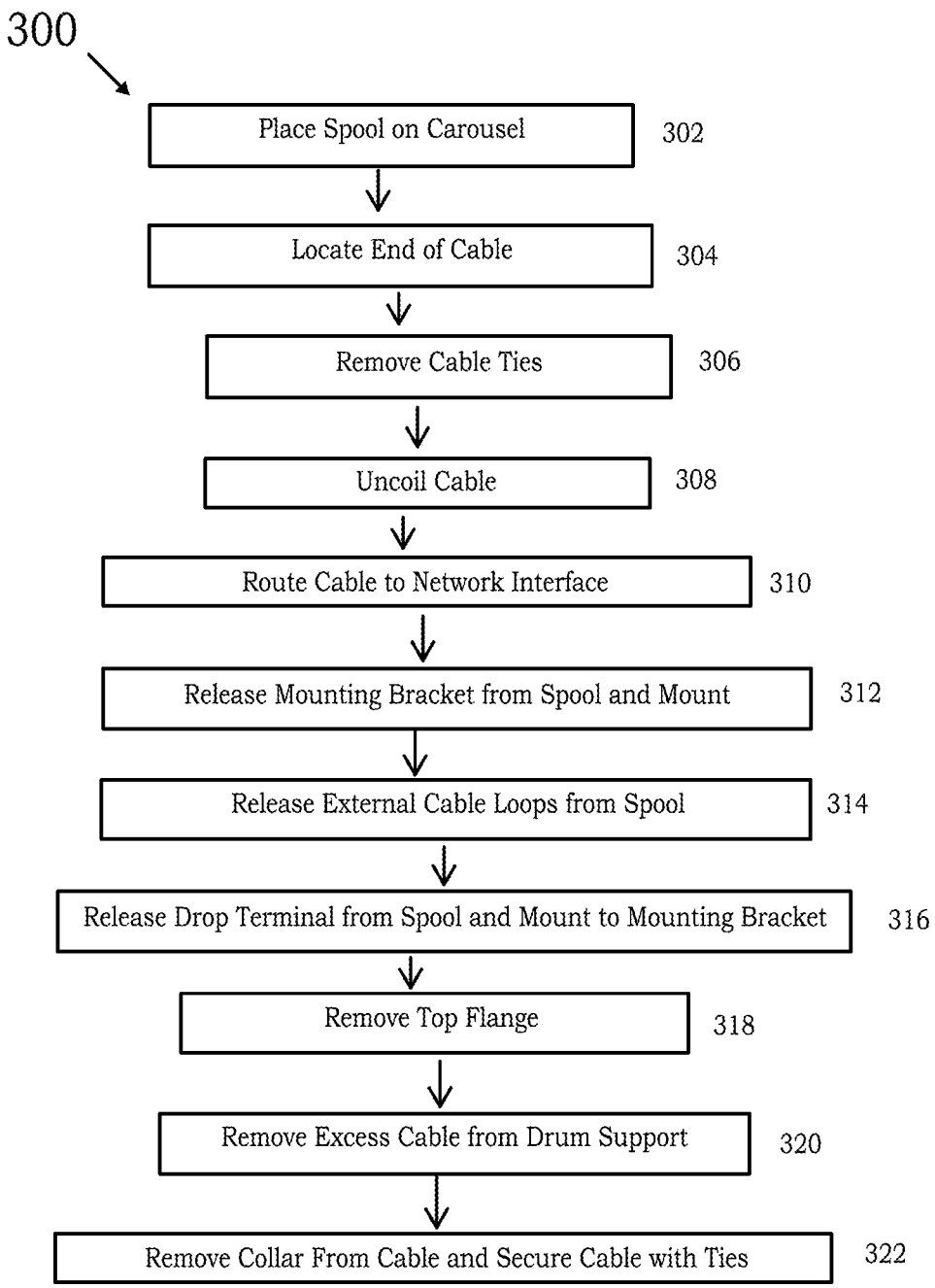
FIG. 14 is a method of uncoiling a cable from a drop terminal deployment system.

More specifically, FIG. 14 depicts a method 300 of uncoiling the cable 14 and separating the drop terminal 202 and the mounting bracket 210 from the spool assembly 12. The spool assembly 12 is first placed on a carousel or mandrel (step 302), or any similar device that will allow the spool assembly 12 to rotate as the cable 14 is uncoiled. Next, the end of the cable 14 is located (step 304). Typically, this is the end proximate the splice enclosure 206 but may be a free end of the cable if the splice enclosure 206 is not utilized. The cable end is deployed from the spool assembly 12 by removing or cutting the cable ties 214 (step 306), if present, and uncoiling the cable 14 (step 308). Again, this uncoiling typically occurs by rotating the spool assembly. The cable 14 is then routed to the desired point or interface in the network (step 310).

After the cable 14 has been deployed from the spool assembly 12, the drop terminal 202 and the mounting bracket 210 must be separated from the spool assembly 12 for mounting. In addition, the spool assembly 12 must be disassembled to release any excess cable slack that is still coiled on the spool assembly 12. The mounting bracket 210 is first released from the spool flange 16 by releasing the securing elements 216 (e.g., hook and hook straps) that secure it to the flange 16. Thereafter, the mounting bracket 210 is mounted in the desired location (step 312). The external cable 212 loops are then released by cutting cable ties 218 that secure the cable 212 to the top flange 16 (step 314). The drop terminal 202 is next released from the spool flange 16 by releasing the securing elements 220 (e.g., hook and hook straps) that secure it to the flange 16. Thereafter, the drop terminal 202 is mounted to the mounting bracket 210 (step 316). The tabs 88 are then lifted to an upright position or cut to release the top flange 16 from the remainder of the spool assembly 12 (step 318), thereby allowing the top flange 16 to be removed. Once the top flange is removed, the excess cable 14 is removed from the drum support 76 (step 320) by moving the remaining coil of cable in a direction substantially parallel with the central longitudinal axis 15. Thereafter, the collar or drum 74 is removed from the coil of cable 14 and the remaining excess cable 14 is secured with cable ties 222 (step 322). Alternatively, hook and loop fasteners or other securing elements may be used to secure the remaining length of cable 14 while the length of cable 14 is still located on the spool assembly 12. Thereafter, the drum 74 and remaining length of cable 14 may be removed from the spool assembly 12. Following these steps may help prevent tangling of the remaining cable 14 during and after removal.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A method of deploying cable from a cable spool assembly, the method comprising:
    paying out a first length of cable from the cable spool assembly, the first length being such that a remaining length of cable remains coiled on the cable spool assembly;
    removing a first flange from the cable spool assembly;
    removing the remaining length of cable from the cable spool assembly by sliding the remaining length of cable off a core of the cable spool assembly while the remaining length of cable remains in a coiled configuration; and
    securing the remaining length of cable in the coiled configuration.

2. The method of claim 1, wherein the remaining length of cable is secured in the coiled configuration before the remaining length of cable is slid from the cable of the cable spool assembly.

3. The method of claim 1, wherein the remaining length of cable is secured in the coiled configuration after the remaining length of cable is slid from the cable of the cable spool assembly.

4. The method of claim 1, wherein the remaining length of coil is coiled about a collar positioned around the core, and wherein the remaining length of coil and the collar are slid off the core together.

5. The method of claim 4, wherein the collar is removed from within the coiled configuration of the remaining cable before the remaining length of cable is secured in the coiled configuration.

* * * * *